US012427774B2

(12) United States Patent
Ueyama

(10) Patent No.: US 12,427,774 B2
(45) Date of Patent: Sep. 30, 2025

(54) PRINTER AND CLEANING METHOD

(71) Applicant: SCREEN HOLDINGS CO., LTD., Kyoto (JP)

(72) Inventor: Minoru Ueyama, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 206 days.

(21) Appl. No.: 18/362,211

(22) Filed: Jul. 31, 2023

(65) Prior Publication Data

US 2024/0083172 A1 Mar. 14, 2024

(30) Foreign Application Priority Data

Sep. 14, 2022 (JP) ................................ 2022-146163

(51) Int. Cl.
*B41J 2/165* (2006.01)

(52) U.S. Cl.
CPC .. *B41J 2/16552* (2013.01); *B41J 2002/16555* (2013.01)

(58) Field of Classification Search
CPC .......... B41J 2/16552; B41J 2002/16555; B41J 2/16585
See application file for complete search history.

(56) References Cited

FOREIGN PATENT DOCUMENTS

| | | | | |
|---|---|---|---|---|
| JP | H07100385 B2 * | 11/1995 | | |
| JP | 2004174845 A * | 6/2004 | | |
| JP | 2016-179549 A | 10/2016 | | |
| WO | WO-2016169372 A1 * | 10/2016 | ............. | B41J 2/165 |

* cited by examiner

*Primary Examiner* — Sharon Polk
(74) *Attorney, Agent, or Firm* — Rimon P.C.

(57) ABSTRACT

A technique allows satisfactory removal of ink droplets adhering to the ejection surface of an ejection head while preventing the occurrence of performance degradation of the ejection surface. A printer performs printing by ejecting ink droplets to an upper surface of a long band-like base material (M). The printer includes an ejection head and a cleaner. The ejection head has an ejection surface in which a plurality of ink ejection outlets for ejecting ink droplets are arranged in a width direction (X). The cleaner cleans the ejection surface. The cleaner includes a gas ejector. The gas ejector ejects gas to the ejection surface from a position away from the ink ejection outlets in the Y direction.

13 Claims, 11 Drawing Sheets

PRINTER AND CLEANING METHOD

RELATED APPLICATIONS

This application claims priority from Japanese Application No. 2022-146163, filed on Sep. 14, 2022. The disclosure of which is incorporated by reference herein.

BACKGROUND OF THE INVENTION

Field of the Invention

The subject matter disclosed in the specification of the present invention relates to a printer and a cleaning method.

Description of the Background Art

Printers are heretofore known for printing an image on a long band-like base material by ejecting ink droplets to the base material transported by a transport mechanism. As an example of this type of printer, Japanese Patent Application Laid-Open No. 2016-179549 describes a printer that includes a print head with a plurality of inkjet heads arranged thereon and a wiper blade that wipes each nozzle while moving in the direction of arrangement of the inkjet heads.

Continuous printing may result in adhesion of ink droplets to the ejection surface of the print head. Japanese Patent Application Laid-Open No. 2016-179549 describes removing ink droplets adhering to the ejection surface of the print head by wiping the ejection surface of the print head by the wiper blade.

SUMMARY OF THE INVENTION

Technical Problem

In the case of conventional technology, however, surface performance (e.g., water repellency) of the ejection surface may degrade due to the wiper blade rubbing against the ejection surface. There is thus demand for a technique that allows removal of ink droplets adhering to the ejection surface while preventing degradation of performance of the ejection surface.

It is an object of the present invention to provide a technique for satisfactorily removing ink droplets adhering to an ejection surface of an ejection head while preventing degradation of performance of the ejection surface.

Solution to Problem

To solve the problem described above, a first aspect of the present invention is a printer for performing printing by ejecting ink droplets onto an upper surface of a long band-like base material. The printer includes a transporter that transports the base material in a first direction, at least one ejection head having an ejection surface in which a plurality of ink ejection outlets for ejecting ink are arranged in a second direction that intersects with the first direction, and a cleaner that cleans the ejection surface. The cleaner includes a gas ejector that ejects gas to the ejection surface from a position away from the plurality of ink ejection outlets in the first direction.

According to the printer of the first aspect, the gas is ejected from the position away from the ink ejection outlets. This allows satisfactory removal of the ink droplets adhering to the ejection surface while preventing degradation of performance of the ejection surface.

A second aspect of the present invention is the printer according to the first aspect, in which the gas ejector generates an airflow that goes at least from one end of the ejection surface to the other end thereof in the first direction.

According to the printer of the second aspect, the airflow is generated from one end of the ejection surface to the other end. This allows removal of ink droplets from the entire ejection surface in the first direction.

A third aspect of the present invention is the printer according to the first or second aspect, in which the gas ejector is capable of ejecting the gas to a region of the ejection surface that includes at least those of the plurality of ink ejection outlets from an ink ejection outlet located at one end in the second direction to an ink ejection outlet located at the other end in the second direction.

According to the printer of the third aspect, the gas is ejected to the region in which the ink ejection outlets are arranged. This allows proper removal of the ink droplets adhering to the ejection surface.

A fourth aspect of the present invention is the printer according to any one of the first to third aspects, in which the ejection surface is inclined vertically upward toward one side in the first direction, and the gas ejector ejects the gas from one side in the first direction to the other side in the first direction.

According to the printer of the fourth aspect, since the airflow is generated from the higher portion of the ejection surface to the lower portion thereof, the ink droplets adhering to the ejection surface can be collected to the lower portion. This allows satisfactory removal of the ink droplets from the ejection surface.

A fifth aspect of the present invention is the printer according to any one of the first to fourth aspects, in which the gas ejector ejects the gas from a slit gas ejection outlet.

A sixth aspect of the present invention is the printer according to any one of the first to fifth aspects, in which the gas ejector ejects the gas from a plurality of gas ejection outlets arranged in the second direction.

A seventh aspect of the present invention is the printer according to any one of the first to sixth aspects, in which the cleaner further includes a temperature and humidity controller that adjusts temperature and humidity of the gas supplied from the gas ejector.

According to the printer of the seventh aspect, the occurrence of condensation on the ejection surface is reduced. Besides, it is possible to prevent drying of the ink ejection outlets.

An eighth aspect of the present invention is the printer according to any one of the first to seventh aspects, in which the cleaner further includes a suction part that sucks the gas ejected from the gas ejector.

According to the printer of the eighth aspect, it is possible to prevent the release of the ink by sucking the gas.

A ninth aspect of the present invention is the printer according to the eighth aspect, in which the cleaner further includes a guide member that has a guide face inclined relative to the ejection surface and that moves ink applied to the other end of the ejection surface in the first direction, toward the guide face.

According to the printer of the ninth aspect, the ink droplets are removed satisfactorily from the ejection surface.

A tenth aspect of the present invention is the printer according to any one of the first to ninth aspects, in which the gas ejector is capable of ejecting the gas toward an inside of the ejection surface in the second direction from a position outwardly away from the ejection surface in the second direction.

According to the printer of the tenth aspect, the release of the ink droplets to the outside of the ejection surface is prevented.

An eleventh aspect of the present invention is the printer according to any one of the first to tenth aspects, in which the gas ejector first starts to eject the gas from a first position and a second position away from the first position in the second direction and then starts to eject the gas from a third position located between the first position and the second position in the second direction.

According to the printer of the eleventh aspect, it is possible to prevent the release of the ink droplets existing in a region from the first position to the second position, to the outside of the region.

A twelfth aspect of the present invention is the printer according to any one of the first to eleventh aspects, in which the at least one ejection head includes a plurality of ejection heads arranged in the second direction.

According to the printer of the twelfth aspect, a printable area is enlarged in the second direction.

A thirteenth aspect of the present invention is the printer according to the twelfth aspect, in which the plurality of ejection heads include a first ejection head and a second ejection head located adjacent to the first ejection head in the second direction, and the gas ejector ejects the gas to a space between the first ejection head and the second ejection head.

According to the printer of the thirteenth aspect, the ink droplets in the boundary portion between the first ejection head and the second ejection head are removed satisfactorily.

A fourteenth aspect of the present invention is the printer according to the twelfth or thirteenth aspect, in which the cleaner further includes a mover that moves the gas ejector in the second direction.

According to the printer of the fourteenth aspect, the ejection surface of each of the ejection heads is cleaned in sequence by moving the gas ejector in the second direction. This allows a reduction in the dimension of the gas ejector in the second direction.

A fifteenth aspect of the present invention is a cleaning method for cleaning an ejection surface of an ejection head, the ejection head including a plurality of ink ejection outlets for ejecting ink to an upper surface of a base material transported in a first direction, the plurality of ink ejection outlets being arranged in a second direction that intersects with the first direction. The cleaning method includes ejecting gas to the ejection surface from a gas ejector located at a position away from the plurality of ink ejection outlets in the first direction.

A sixteenth aspect of the present invention is the cleaning method according to the fifteenth aspect, in which in the ejecting of the gas, the gas ejector ejects the gas while being stationary at a fixed position relative to the ejection surface of the ejection head.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
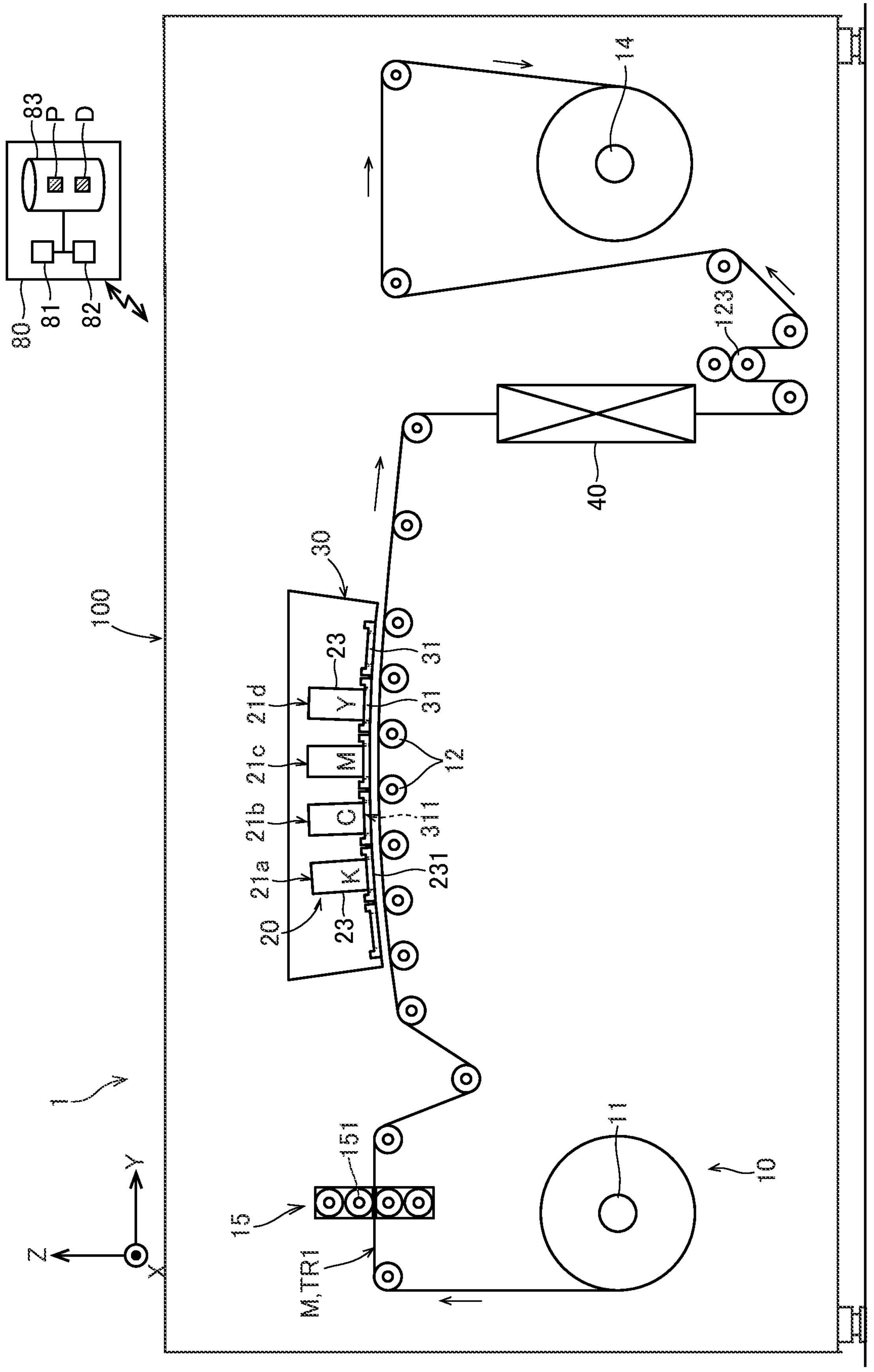
FIG. 1 is a diagram schematically showing a configuration of a printer according to an embodiment.

Hereinafter, an embodiment of the present invention will be described with reference to the accompanying drawings. Note that constituent elements described in this embodiment are merely examples, and the scope of the present invention is not intended to be limited thereto. To facilitate understanding of the drawings, the dimensions or number of each constituent element may be illustrated in exaggerated or simplified form as necessary.

To facilitate understanding of the positional relationship of each element, arrows indicating X, Y, and Z directions that are orthogonal to one another may be shown in the drawings. In the following description, the X and Y directions are assumed to be horizontal directions parallel to a horizontal plane, and the Z direction is assumed to be a direction parallel to the vertical direction. The direction indicated by the tip end of each arrow is assumed to be a plus (+) direction, and the direction opposite thereto is assumed to be a minus (−) direction. In the following description, the +Z side is assumed to be the upper side, and the −Z side is assumed to be the lower side.

1. Embodiment

FIG. 1 is a diagram schematically showing a configuration of a printer 1 according to an embodiment. The printer 1 performs printing by ejecting ink onto the upper surface of a long band-like base material M. As shown in FIG. 1, the printer 1 includes a transporter 10, an image recorder 20, a dryer 40, and a controller 80.

The transporter 10 includes a delivery roller 11, a plurality of transport rollers 12, a taking-up roller 14, and a cleaner 15. The base material M is wound in a roll on the delivery roller 11. The base material M that is unreeled from the delivery roller 11 is transported in one direction by each transport roller 12 and wound in a roll on the taking-up roller 14. The base material M moves along a prescribed transport path TR1 while being supported by each transport roller 12 located at a prescribed position.

The transport rollers 12 include nip rollers 123. The nip rollers 123 actively rotate at a constant speed while grasping the base material M in contact with the recording surface of the base material M and the rear surface thereof opposite to the recording surface. The transporter 10 applies tension to the base material M by adjusting the rotation speed of the delivery roller 11 relative to the rotation speed of the nip rollers 123. This prevents the occurrence of troubles such as loosening of the base material M or creation of creases in the base material M during transport.

In the following description, the travel direction of the base material M along the transport path TR1 is simply referred to as the "travel direction." The downstream side in the travel direction (the side closer to the taking-up roller 14) may be simply referred to as the "downstream side," and the upstream side in the travel direction (the side closer to the delivery roller 11) may be simply referred to as the "upstream side." The X direction is orthogonal to the travel direction and agrees with a width direction parallel to the surface of the base material M. In the following description, the X direction is referred to as the "width direction X."

The base material M unreeled from the delivery roller 11 first passes through the cleaner 15. The cleaner 15 includes a plurality of suction rolls 151 aligned in the Z direction. The suction rolls 151 rotate in contact with the recording surface and rear surface of the base material M. Foreign substances that adhere to the recording surface and rear surface of the base material M are adsorbed by the suction rolls 151. This reduces the number of foreign substances adhering to the base material M before printing. Accordingly, it is possible to reduce the occurrence of print defects such as rejection or oozing of ink due to the presence of foreign substances. Note that the cleaner 15 may clean the base material M by any other method.

The transporter 10 transports the base material M that has passed through the cleaner 15 to the image recorder 20. Then, the transporter 10 transports the base material M in the +Y direction under the image recorder 20. As shown in FIG. 1, the base material M passes under the image recorder 20, with its recording surface facing upward (toward head units 21*a* to 21*d*). The Y direction is one example of a "first direction."

The image recorder 20 is capable of ejecting, for example, droplets of aqueous-based ink (hereinafter, referred to as "ink droplets") to the base material M transported by the transporter 10. The image recorder 20 according to the present embodiment includes head units 21*a*, 21*b*, 21*c*, and 21*d* arranged in the order specified toward the downstream side in the travel direction. The head units 21*a* to 21*d* are arranged at intervals in the travel direction of the base material M. In the following description, when there is no need to distinguish among the head units 21*a* to 21*d*, the head units 21*a* to 21*d* may be simply referred to as the "head units 21."

The head units 21*a* to 21*d* form a color image on the recording surface (upper surface) of the base material M by ejecting ink droplets of at least two colors. For example, the head unit 21*a* may eject black (K) ink droplets, the head unit 21*b* may eject cyan (C) ink droplets, the head unit 21*c* may eject magenta (M) ink droplets, and the head unit 21*d* may eject yellow (Y) ink droplets.

Figure 2:
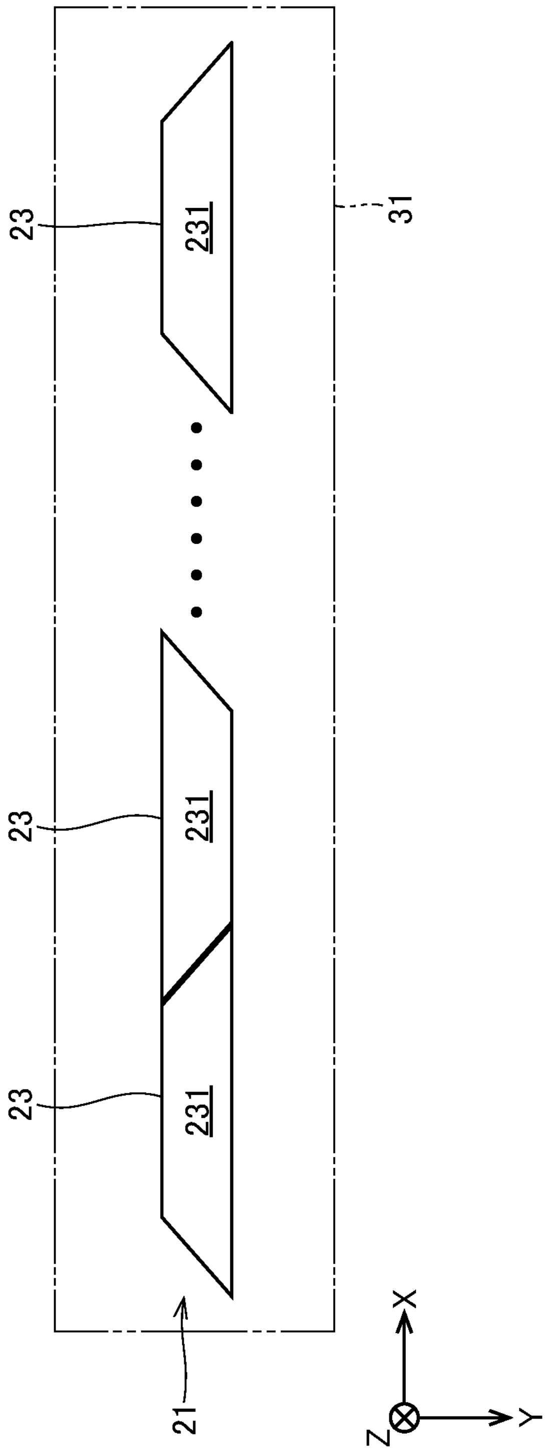
FIG. 2 is a bottom view of one head unit according to the embodiment.

FIG. 2 is a bottom view of one head unit 21 according to the embodiment. The head unit 21 includes a plurality of ejection heads 23 arranged in the width direction X. The head unit 21 is supported by a base plate 31 of a support unit 30. To be more specific, each ejection head 23 is fixed to the base plate 31 while being inserted in a through hole provided in the base plate 31. As shown in FIG. 2, the lower surface of each ejection head 23, i.e., an ejection surface 231, is exposed to the lower surface of the base plate 31. The ejection surface 231 may, for example, be a flat surface. By arranging the ejection heads 23 in the width direction X in this way, it is possible to enlarge a printable area in the width direction X.

As shown in FIG. 2, each ejection head 23 has a trapezoidal (isogonal trapezoidal) outside shape when viewed in plan from the −Z side (in bottom view). That is, the ejection surface 231 has a trapezoidal shape in plan view. The head unit 21 is configured by the ejection heads 23 aligned in a straight line in the width direction X. To be more specific, the ejection heads 23 are arranged in such a position that their upper and lower bases are oriented in the Y direction. The ejection heads 23 are also arranged such that their upper and lower bases alternately change places. The legs of adjacent ejection heads 23 are arranged in parallel with each other. The interval between two adjacent ejection heads 23, i.e., an interval D1 between the legs of the two adjacent ejection heads 23 (see FIG. 3), is appropriately set according to the resolution of the head unit 21.

Note that the outside shape of the ejection heads 23 is not limited to the trapezoidal shape as shown in FIG. 2. For example, the ejection heads 23 may have any other outside shape other than the trapezoidal shape, such as a parallelogram shape.

Figure 3:
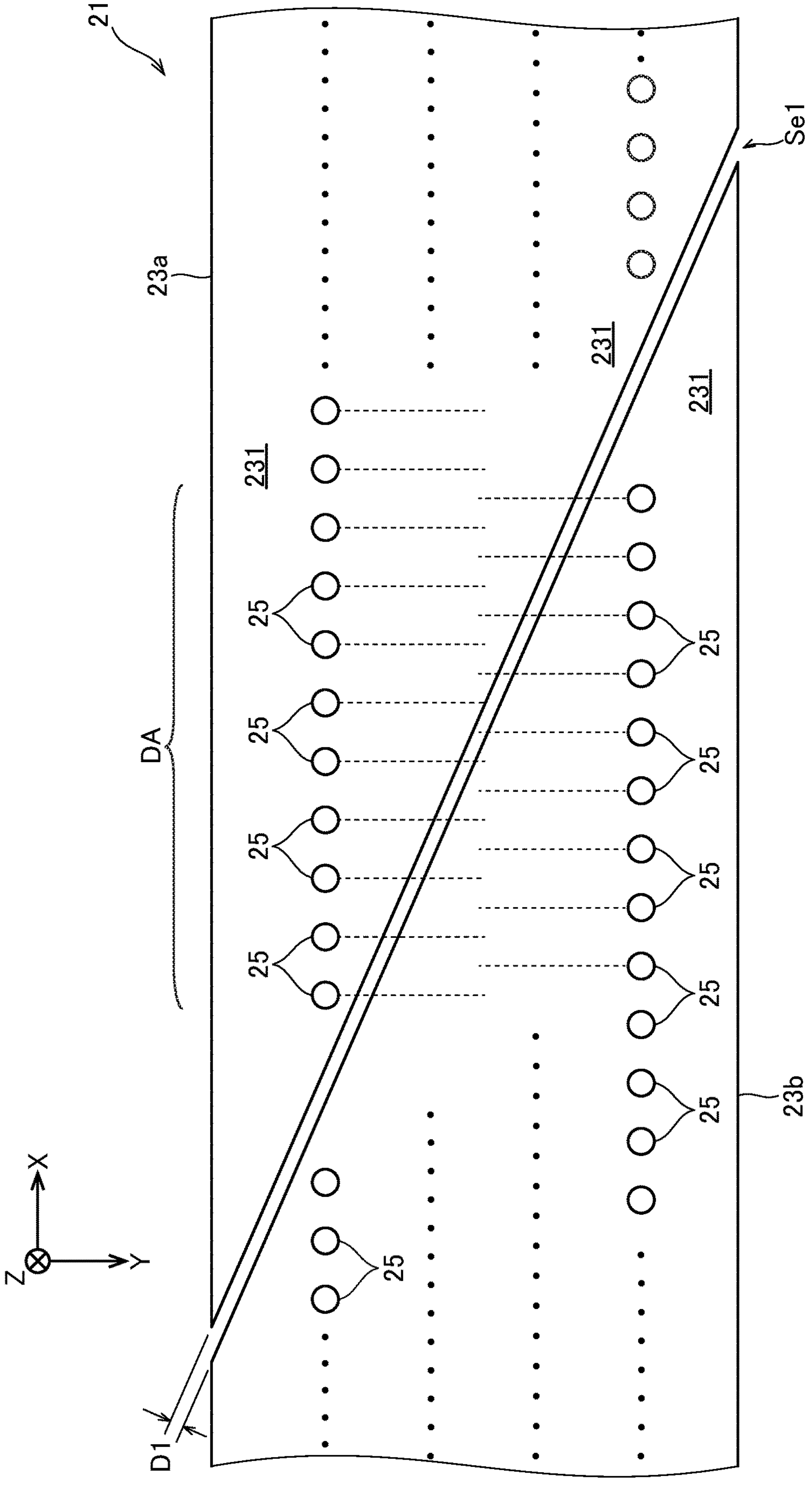
FIG. 3 is a partial enlarged diagram showing a joint between ejection heads adjacent to each other in a width direction according to the embodiment.

FIG. 3 is a partial enlarged diagram showing a joint Se1 between ejection heads 23 adjacent to each other in the width direction X according to the embodiment. In the following description, one of the ejection heads 23 aligned in the width direction X is referred to as an "ejection head 23*a*," and another ejection head 23 arranged adjacent to the ejection head 23*a* on the +X side is referred to as an "ejection head 23*b*."

As shown in FIG. 3, each ejection surface 231 has a plurality of ink ejection outlets 25 aligned in the width direction X so as to eject ink droplets. When the head unit 21 is viewed in the Y direction, each ink ejection outlet 25 does not overlap with the other ink ejection outlets in the width direction X. To be more specific, when referring to an overlap region DA in which the ejection heads 23*a* and 23*b* adjacent to each other in the width direction X overlap in the Y direction, the ink ejection outlets 25 of the ejection head 23*a* and the ink ejection outlets 25 of the ejection head 23*b* are alternately located in the width direction X. In other words, each ink ejection outlet 25 of the ejection head 23*b* is arranged in the center in the width direction X of two adjacent ink ejection outlets 25 of the ejection head 23*a*. Moreover, each ink ejection outlet 25 of the ejection head 23*a* is arranged in the center in the width direction X of two adjacent ink ejection outlets 25 of the ejection head 23*b*. Accordingly, the head unit 21 has a predetermined resolution in the overlap region DA. For example, when the resolution is 1200 dpi, the interval between the center of each ink ejection outlet 25 of the ejection head 23*a* and the center of each ink ejection outlet 25 of the ejection head 23*b* is set to approximately 21 μm (=25.4 mm/1200).

Note that the interval between the ink ejection outlets 25 in regions other than the overlap region DA is set to be smaller than the interval between the ink ejection outlets 25 in the overlap region DA. Accordingly, the entire region of the head unit 21 in the width direction X is set to have a predetermined resolution.

As shown in FIG. 1, the printer 1 performs printing on the base material M by transporting the base material M and ejecting ink droplets from the head units 21, with the head units 21 located at fixed positions. That is, the printer 1 performs so-called one-pass printing.

As shown in FIG. 1, the base material M that has passed through the image recorder 20 moves to the dryer 40. The dryer 40 dries a portion of the base material M that has been printed by the image recorder 20. There are no particular limitations on the method used by the dryer 40 to dry the base material M. For example, the dryer 40 may subject the base material M to hot air, may subject the base material M to infrared rays emitted from an infrared heater, may bring a heated roller into contact with the base material M, or may heat the surface of the base material M by a flash lamp or any other means.

The base material M that has passed through the dryer 40 is collected by the taking-up roller 14 via the transport rollers 12 including the nip rollers 123.

Figure 4:
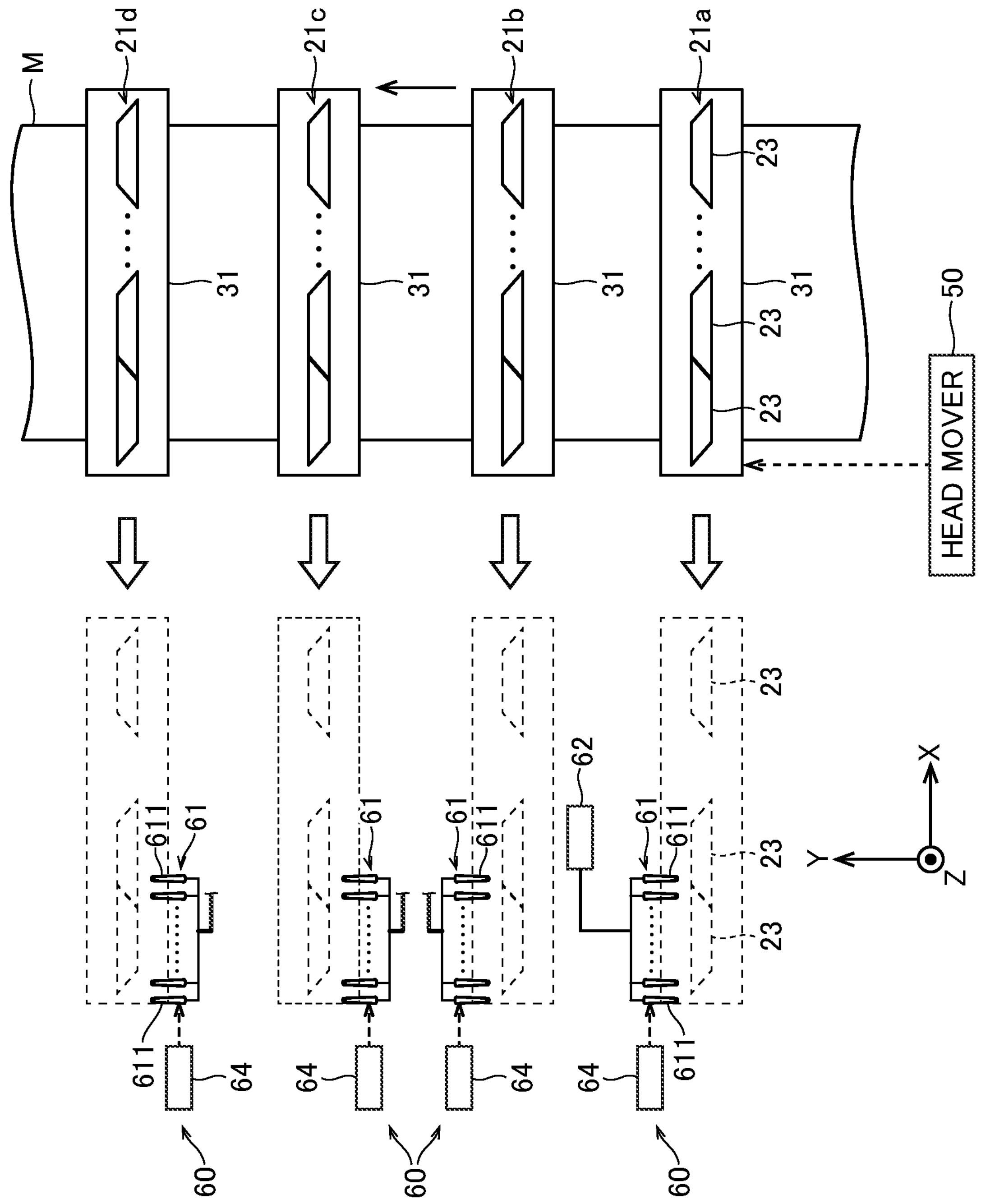
FIG. 4 is a diagram showing a head mover and a cleaner according to the embodiment.
Figure 5:
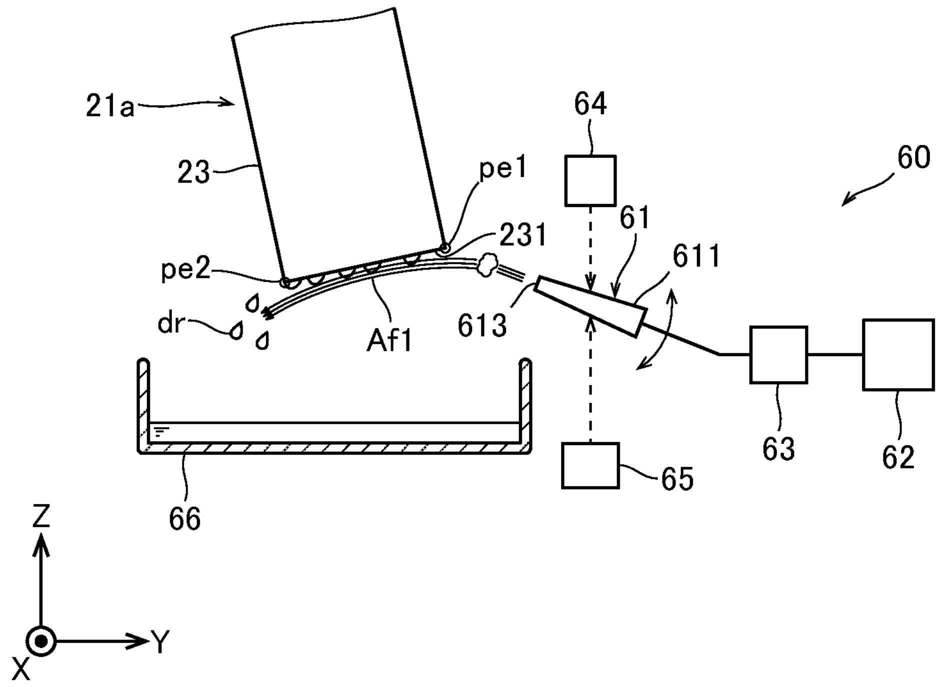
FIG. 5 is a side view showing a configuration of one cleaner according to the embodiment.

FIG. 4 is a diagram showing a head mover 50 and cleaners 60 according to the embodiment. FIG. 5 is a side view showing a configuration of one cleaner 60 according to the embodiment. As shown in FIG. 4, the printer 1 includes the head mover 50 and a plurality of cleaners 60. The head mover 50 may include, for example, a direct-acting mechanism such as a ball screw, a rack and pinion, or a linear motor. The head mover 50 moves the four head units 21*a* to 21*d* in the width direction X by moving the support unit 30 in the width direction X. As shown in FIG. 4, the head mover 50 moves the head units 21*a* to 21*d* between a printing position indicated by solid lines and a cleaning position indicated by broken lines. The cleaning position is away from the printing position in the −X direction.

As shown in FIG. 4, the printer 1 includes four cleaners 60. Each of the four cleaners 60 cleans one of the four head units 21*a* to 21*d*. The four cleaners 60 are located at intervals in the Y direction. The cleaners 60 are located away on the −X side from the head units 21*a* to 21*d* that are located at the printing position.

As shown in FIG. 1, the transport path TR1 is set such that the base material M is bent upward in a curve under the image recorder 20. Each ejection head 23 of the head units 21*a* to 21*d* is inclined along the curve of the base material M. For example, in the case of the head unit 21*a*, the ejection surfaces 231 of the ejection heads 23 are inclined vertically upward toward the +Y side. In the case of the head unit 21*d*, the ejection surfaces 231 of the ejection heads 23 are inclined vertically upward in the −Y direction.

FIG. 5 shows one ejection head 23 of the head unit 21*a* that is located at the cleaning position. As shown in FIGS. 4 and 5, the cleaner 60 includes a gas ejector 61, a gas supplier 62, a temperature and humidity controller 63, a mover 64, an angle adjuster 65, and a waste fluid tray 66.

The gas ejector 61 ejects gas to the ejection surface 231 of the ejection head 23. As shown in FIG. 4, the gas ejector 61 includes a plurality of gas nozzles 611. The gas nozzles 611 are aligned at intervals in the width direction X.

Each gas nozzle 611 has one gas ejection outlet 613. That is, the gas ejector 61 has a plurality of gas ejection outlets 613 aligned in the width direction X.

In the above-described embodiment, the gas ejector 61 includes a plurality of gas ejection outlets 613 aligned in the width direction X. Alternatively, the gas ejector 61 may include, for example, a slit gas ejection outlet that extends in the width direction X. In this case, the gas is ejected from the wide gas ejection outlet, and this reduces variations in the amount of the gas supplied in the width direction X.

As shown in FIG. 5, the gas nozzle 611 is located away in the Y direction from the ejection surface 231 located at the cleaning position. The gas nozzle 611 ejects the gas to the ejection surface 231 from the position away from the ejection surface 231 in the Y direction. That is, the gas ejector 61 ejects the gas to the ejection surface 231 from the position away from the ejection surface 231 in the Y direction.

The gas supplier 62 supplies gas to each gas nozzle 611 of the gas ejector 61. The gas supplier 62 is connected to each gas nozzle 611 via piping that passes the gas. The gas supplier 62 may include, for example, a fan for pumping the gas. The gas supplier 62 may supply the gas existing outside the printer 1 or may suck and supply the gas within the printer 1.

The temperature and humidity controller 63 adjusts the humidity and temperature of the gas supplied from the gas supplier 62 to the gas nozzle 611 of the gas ejector 61. The temperature and humidity controller 63 may appropriately include, for example, a heater for adjusting the temperature of the gas, a dehumidifier for dehumidifying the gas, or a humidifier for humidifying the gas. The temperature and humidity controller 63 is located in the piping that connects the gas supplier 62 and the gas nozzle 611. The temperature and humidity controller 63 performs control so as to bring the temperature and humidity of the gas closer to a preset temperature and humidity in accordance with a control signal received from the controller 80. Note that the controller 80 controls the temperature and humidity controller 63 on the basis of detection values output from a thermo sensor and a humidity sensor (not shown).

The adjustment of the temperature and humidity of the gas by the temperature and humidity controller 63 reduces the occurrence of condensation on the ejection surface 231. It is also possible to prevent drying of the ink ejection outlets 25 of the ejection head 23.

The mover 64 moves the gas nozzles 611 of the gas ejector 61 in the width direction X. In the example shown in FIG. 4, the range that one gas ejector 61 is capable ejecting gas at once is assumed to be the ejection surface 231 of one ejection head 23. Thus, as a result of the mover 64 moving the gas ejector 61 in the width direction X, it is possible to clean the ejection surfaces 231 aligned in the width direction X in sequence and to clean an ejection surface 231 located at a specific position.

Note that the gas ejector 61 may be configured to be capable of ejecting gas at once to two or more ejection surfaces 231 aligned in the width direction X. In this case, the two or more ejection surfaces 231 can be cleaned at once.

The angle adjuster 65 is connected to the gas nozzles 611 and adjusts the directions of ejection of the gas from the gas nozzles 611 (ejection direction). For example, the angle adjuster 65 is capable of changing the angle of the orientation of each gas nozzle 611 relative to a horizontal plane (XY plane).

The waste fluid tray 66 collects ink droplets dr dropping from the ejection surfaces 231 of the ejection heads 23 by means of an airflow Af1 generated by the gas ejector 61. The waste fluid tray 66 is arranged below the ejection heads 23 located at the cleaning position.

As shown in FIG. 5, the ejection head 23 of the head unit 21*a* is inclined vertically upward toward the +Y side. The gas nozzles 611 of the gas ejector 61 eject the gas in the −Y direction from positions away toward the +Y side that is the higher side of the inclined ejection surface 231. This generates the airflow Af1 flowing from the higher portion of the ejection surface 231 to the lower portion thereof. Accordingly, the ink droplets dr adhering to the ejection surface 231 can be collected to the lower portion and removed satisfactorily from the ejection surface 231.

In the case of the head unit 21*b*, as in the case of the head unit 21*a*, the ejection surfaces 231 of the ejection heads 23 are inclined vertically upward toward the +Y side. Thus, in the case of the head unit 21*b*, the gas ejector 61 of the cleaner 60 may eject the gas in the −Y direction from a position away from the ejection surface 231 on the +Y side as in the case of the head unit 21*a*. This allows the ink droplets dr adhering to the ejection surfaces 231 to be collected to the lower portion and removed satisfactorily.

In the case of the head units 21*c* and 21*d*, the ejection surfaces 231 of the ejection heads 23 are inclined vertically upward toward the −Y side. Thus, in the case of the head units 21*c* and 21*d*, the gas ejectors 61 of the cleaners 60 may eject the gas in the +Y direction from positions away from the ejection surfaces 231 on the —Y side. This allows the ink droplets dr adhering to the ejection surfaces 231 to be collected to the lower portion and removed satisfactorily.

As shown in FIG. 5, each gas nozzle 611 of the gas ejector 61 generates the airflow Af1 that passes from at least one end pe1 of the ejection surface 231 to the other end pe2 thereof in the Y direction. Accordingly, the ink droplets dr can be removed from the entire ejection surface 231 in the Y direction. As shown in FIG. 5, each gas nozzle 611 may preferably eject the gas toward the one end pe1 of the ejection surface 231 or toward the vicinity thereof. This prevents the gas from directly hitting the ink ejection outlets 25 and thereby reduces the possibility that the gas may enter the ink ejection outlets 25. Accordingly, it is possible to prevent ejection failures from occurring in the ink ejection outlets 25 due to blasting of the gas.

Figure 6:
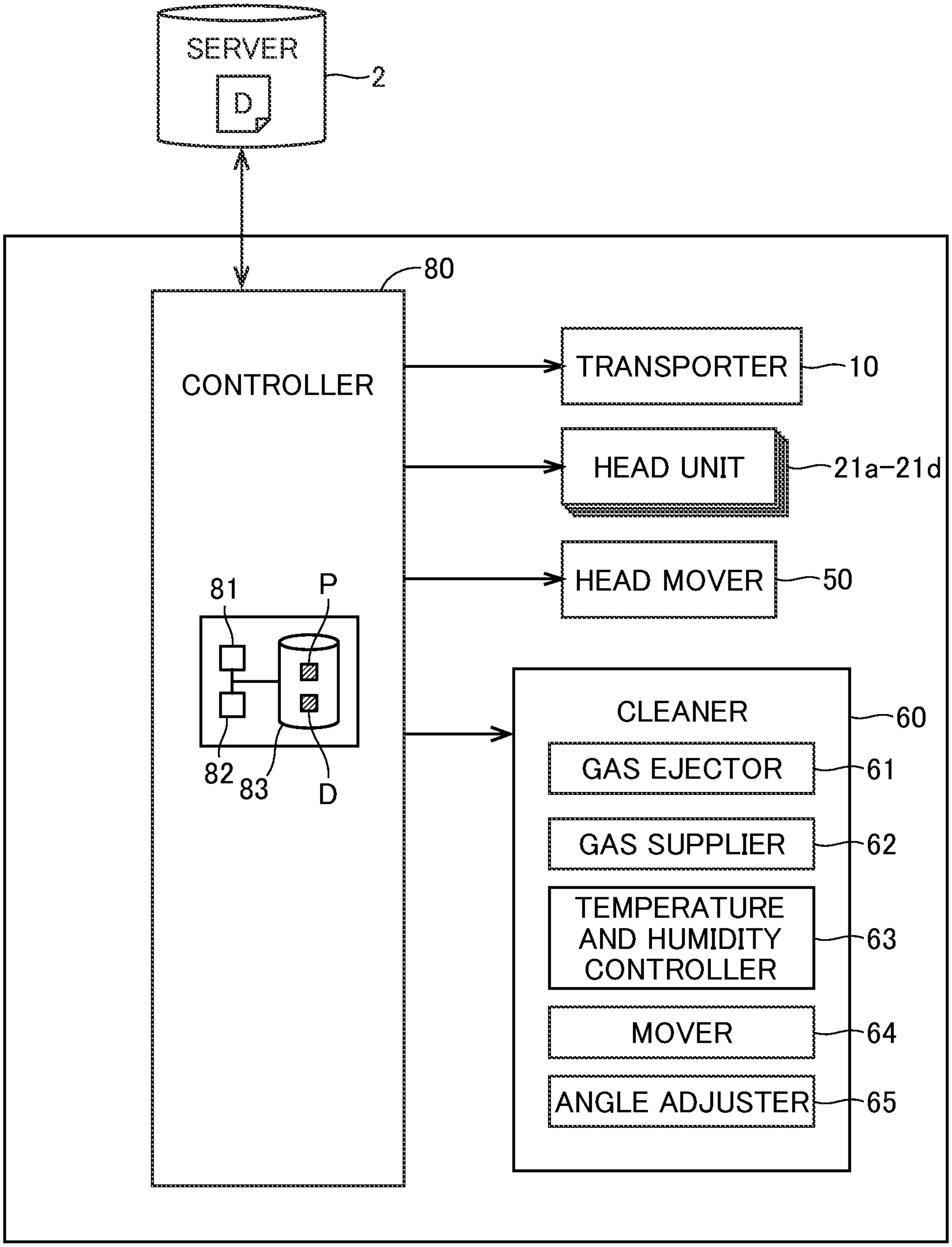
FIG. 6 is a block diagram showing electrical connection of a controller in the printer according to the embodiment.

FIG. 6 is a block diagram showing an electrical connection of the controller 80 in the printer 1 according to the embodiment. The controller 80 is a computer and includes a processor 81 such as a CPU, memory 82 such as a RAM, and an auxiliary storage 83 such as a hard disk. As shown in FIG. 6, the controller 80 is electrically connected to the transporter 10, the head units 21*a* to 21*d*, and the head mover 50. The controller 80 is also electrically connected to the cleaners 60 (specifically, the gas ejectors 61, the gas suppliers 62, the temperature and humidity controllers 63, the movers 64, and the angle adjusters 65). Note that the electrical connection as used herein includes communicable connection. The controller 80 controls operations of each component connected to the controller 80 by causing the processor 81 to execute computer programs P installed in the auxiliary storage 83. Under the control of the controller 80, the printer 1 performs processing such as print processing and cleaning of the ejection surfaces 231 by the cleaners 60.

As shown in FIG. 6, the controller 80 may be electrically connected to a server 2 provided outside the printer 1. The server 2 may store, for example, image data D that is to be printed. In the print processing, the transporter 10 transports the base material M, the controller 80 reads out designated image data D from the server 2, and each ejection head 23 is caused to eject ink droplets of each color in accordance with the image data D and the amount of transport of the base material M. The amount of transport of the base material M is measured based on, for example, encoder signals provided by the transport rollers 12 of the transporter 10. Note that the image data D may be provided to the controller 80 without the intervention of the server 2.

Description of Operations

Figure 7A:
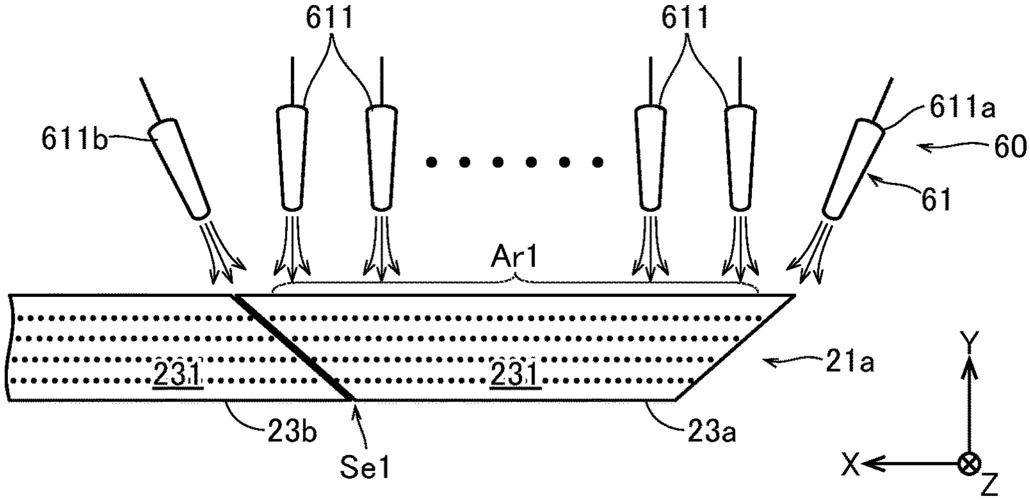
FIGS. 7A to 7C are bottom views showing ejection surfaces cleaned by a cleaner according to the embodiment.
Figure 7B:
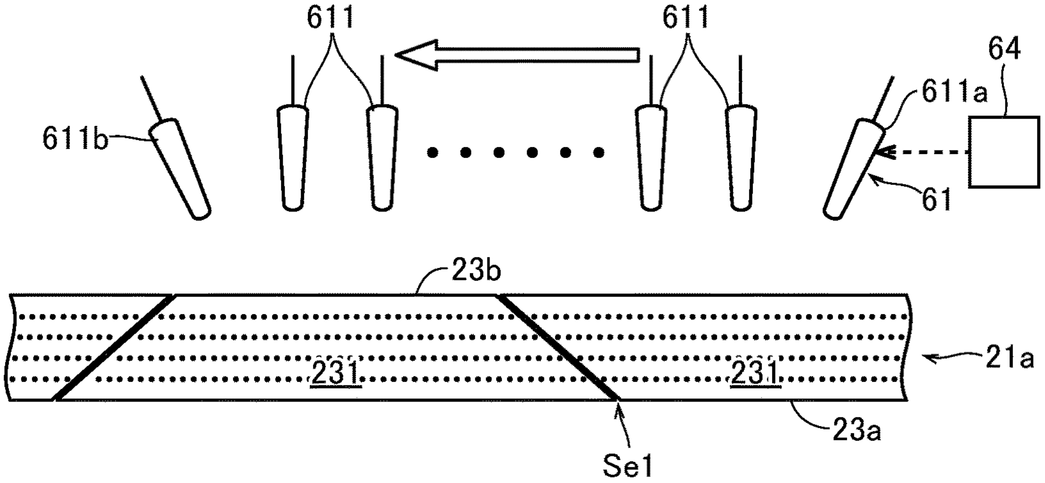
Figure 7C:
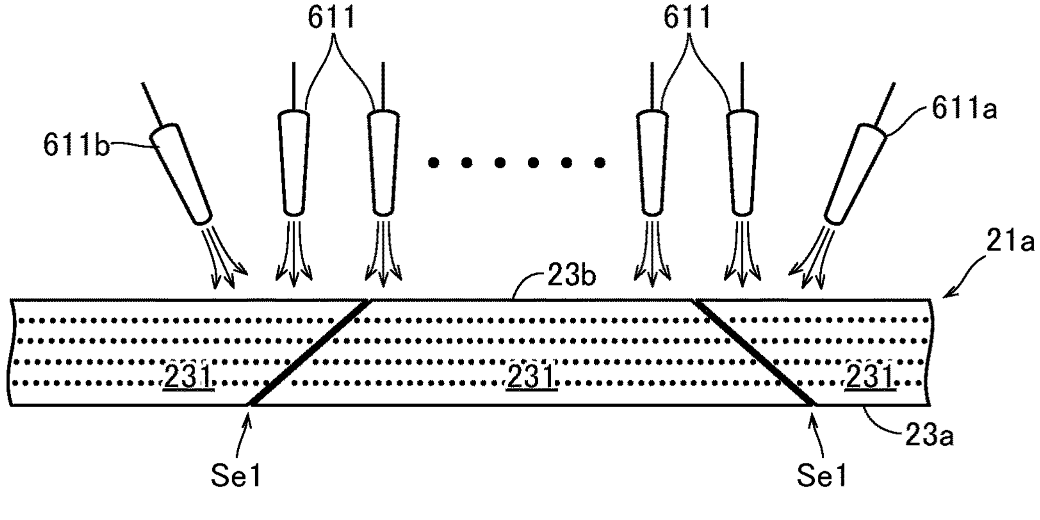

Next, the cleaning processing performed by the printer 1 will be described. FIGS. 7A to 7C are bottom views showing ejection surfaces 231 that are cleaned by a cleaner 60 according to the embodiment. FIG. 7A is a diagram showing how the gas ejector 61 of the cleaner 60 ejects the gas to the ejection surface 231 of the ejection head 23*a* located at the position closest to the −X side. FIG. 7B is a diagram showing how the mover 64 moves the gas ejector 61 in the width direction X. FIG. 7C is a diagram showing how the gas ejector 61 ejects the gas to the ejection surface 231 of the ejection head 23*b* located adjacent on the +X side to the ejection head 23*a*.

As shown in FIG. 7A, the gas ejector 61 is capable of ejecting the gas from the gas nozzles 611 to an area Ar1 of the ejection surface 231 that ranges from an ink ejection outlet 25 located at one end in the width direction X to an ink ejection outlet 25 located at the other end in the width direction X. By in this way ejecting the gas to the area Ar1 with the ink ejection outlets 25 arranged therein, it is possible to properly remove the ink droplets adhering to the ejection surface 231.

The gas nozzles 611 of the gas ejector 61 includes a gas nozzle 611*a* located at the end on the −X side and a gas nozzle 611*b* located on the +X side. The gas nozzle 611*a* ejects the gas in a direction inclined to the +X direction from a position outwardly (specifically, on the −X side) away from the ejection surface 231 of the ejection head 23*a*. The gas nozzle 611*b* ejects the gas in a direction inclined to the −X direction relative to the Y direction from a position outwardly (specifically, on the +X side) away from the ejection surface 231 of the ejection head 23*a*. That is, the gas nozzles 611*a* and 611*b* eject the gas in inward directions. In this way, the inward ejection directions of the gas nozzles 611*a* and 611*b* prevents the release of the ink droplets dr adhering to the ejection surfaces 231 to the outer side in the width direction X.

When the cleaning of the ejection surface 231 of the ejection head 23*a* is completed, the mover 64 moves the gas ejector 61 in the width direction X (here, in the +X direction) to a position at which the cleaning of the ejection head 23*b* is performed as shown in FIG. 7B. When the movement of the gas ejector 61 is completed, the gas ejector 61 ejects the gas toward to the ejection surface 231 of the ejection head 23*b*. Accordingly, the ejection surface 231 of the ejection head 23*b* is cleaned. In this way, the printer 1 repeats alternately moving the gas ejector 61 and ejecting the gas from the gas ejector 61 in order to clean the ejection surfaces 231 of the ejection heads 23 arranged in the width direction X.

Since the cleaner 60 cleans the ejection surfaces 231 by blowing the gas, damage to the ejection surfaces 231 (e.g., degradation of films such as a water-repellent film treated on the ejection surfaces 231) can be reduced.

In the present embodiment, the range that one gas ejector 61 can clean is one ejection surface 231. Thus, it is possible to individually clean the ejection surfaces 231 arranged in the width direction X. Therefore, it is possible to clean only those ejection surfaces 231 that need cleaning. In the case where of performing so-called purging, i.e., the operation of ejecting ink from the ejection heads 23 before cleaning in order to reduce the occurrence of ejection failures, the purging only needs to be performed on ejection heads 23 that need cleaning. Accordingly, ink consumption is reduced as compared with the case where the purging is performed on all of the ejection heads 23 included in one head unit 21. This contributes to resource savings and results in a reduction of the amount of ink waste.

In the case where the joint Se1 between each adjacent ejection heads 23 has the shape of an upwardly recessed groove, the ink droplets dr may be accumulated in the joint Se1. The ink droplets dr accumulated in such interstices are difficult to remove by simple wiping using the wiper blade as described in Japanese Patent Application Laid-Open No. 2016-179549. In contrast, the printer 1 according to the present embodiment is capable of satisfactorily removing the ink droplets dr adhering to the joint Se1 by causing the airflow Af1 to also act on the joint Se1.

In the case of causing each gas nozzle 611 of the gas ejector 61 to eject the gas, the gas nozzle 611 is stopped at a fixed position relative to the ejection surface 231 of the ejection head 23 when ejecting the gas (gas ejection process) as shown in FIGS. 5, 7A, and 7C. This stabilizes the generation of the airflow Af1 below the ejection surface 231 and thereby allows proper removal of the ink droplets dr adhering to the ejection surface 231.

Note that it is not an absolute necessity to fix the position of each gas nozzle 611 during the ejection of the gas. For example, the gas ejector 61 may be moved in the width direction X while causing the gas nozzles 611 to eject the gas.

As another alternative, the gas ejector 61 may be configured to eject the gas only to a range narrower than the above-described region Ar1. In this case, the entire ejection surface 231 may be cleaned by causing the gas ejector 61 to move at a constant speed in the width direction X while ejecting the gas or by alternately repeating stopping and moving the gas ejector 61.

In the above description, the mover 64 moves the gas ejector 61 in the width direction X to change an ejection head 23 to be cleaned by the gas ejector 61. Alternatively, the head mover 50 may move the head unit 21 in the width direction X to change an ejection head 23 to be cleaned by the gas ejector 61. In this case, it is possible to omit the mover 64.

Figure 8A:
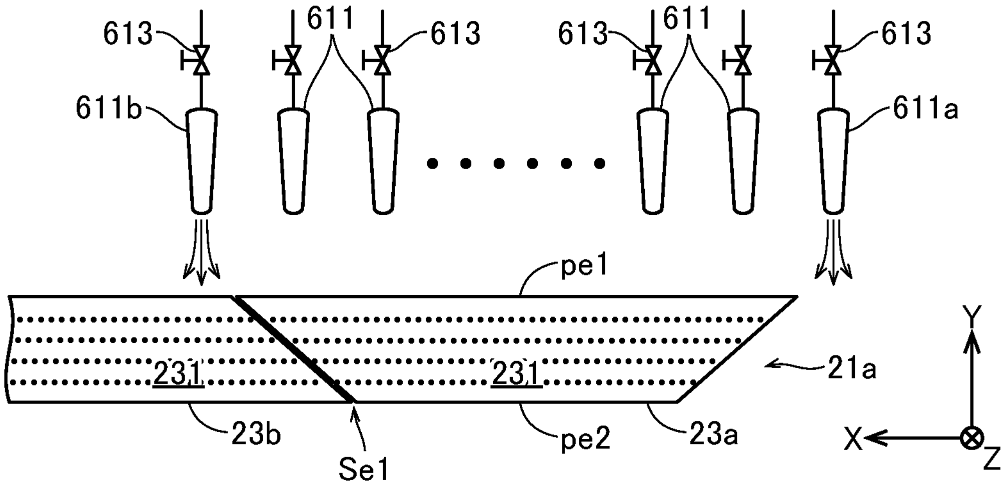
FIGS. 8A and 8B are diagrams showing another example of the configuration of the gas ejector shown in FIG. 7.
Figure 8B:
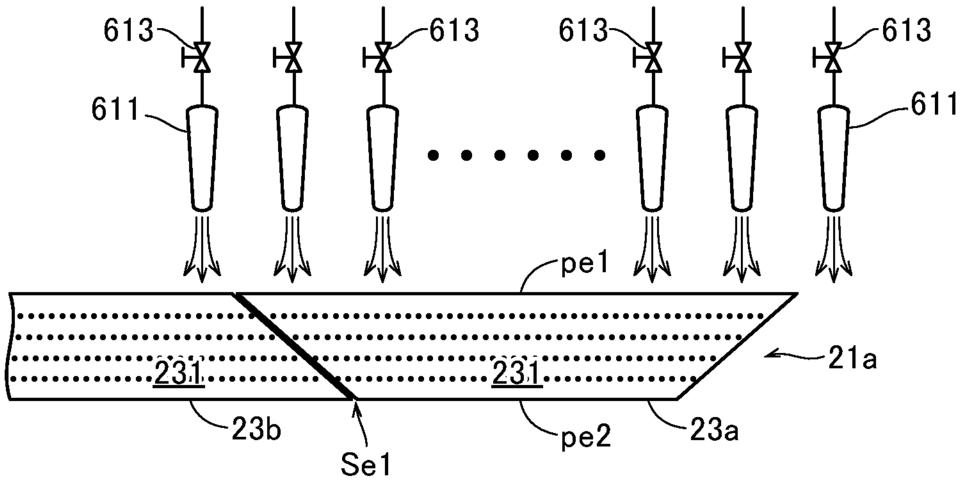

FIGS. 8A and 8B are diagrams showing another example of the configuration of the gas ejector 61 shown in FIGS. 7A to 7C. In the example shown in FIGS. 7A to 7C, the ejection direction of the gas nozzles 611*a* and 611*b* are set to the inward directions. However, as shown in FIG. 8A, the ejection directions of the gas nozzles 611*a* and 611*b* may be set to the same direction as the ejection direction of the other gas nozzles 611 provided between the gas nozzles 611*a* and 611*b* (the −Y direction in the example shown in the drawing).

In the case of cleaning an ejection head 23 by this gas ejector 61, first, only the gas nozzles 611*a* and 611*b* may start to eject the gas as shown in FIG. 8A. Then, after a lapse of a predetermined period of time, the gas nozzles 611 provided between the gas nozzles 611*a* and 611*b* may start to eject the gas as shown in FIG. 8B. The position of the gas nozzle 611*a* when ejecting the gas is one example of a "first position." The position of the gas nozzle 611*b* when ejecting the gas is one example of a "second position" that is located away from the first position in the width direction X. The position of each gas nozzle 611 between the gas nozzles 611*a* and 611*b* when ejecting the gas is one example of a "third position."

In this way, first the two gas nozzles 611*a* and 611*b* located at an interval in the width direction X start to eject the gas, and then each gas nozzle 611 provided between the two gas nozzles starts to eject the gas. This prevents the release of the ink droplets dr adhering to the region between the gas nozzles 611*a* and 611*b* to the outer sides in the width direction X.

Note that each cleaner 60 that controls the timing of ejecting the gas from each gas nozzle 611 may include a plurality of valves 613 for opening or closing the piping that connects each gas nozzle 611 and the gas supplier 62. Then, the controller 80 may individually control the timing of ejecting the gas from each gas nozzle 611 by controlling the operation of opening or closing each valve 613.

Figure 9:
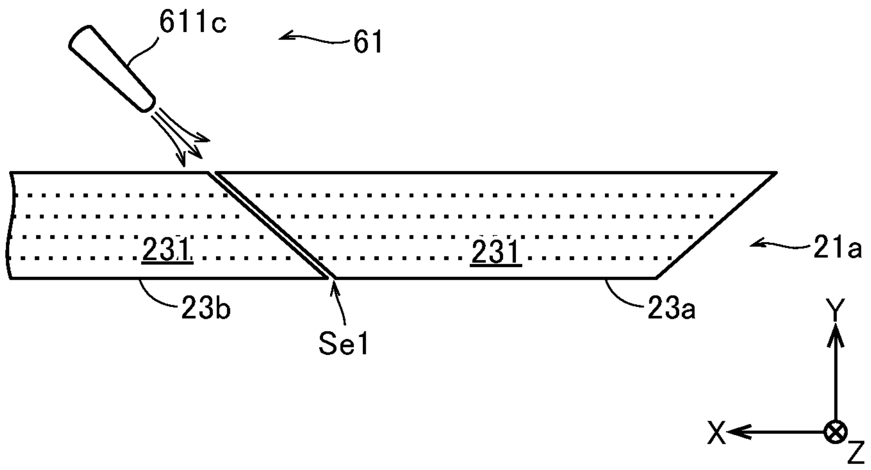
FIG. 9 is a diagram showing a gas nozzle according to the embodiment.

FIG. 9 is a diagram showing a gas nozzle 611*c* according to the embodiment. The gas nozzles 611 of the gas ejector 61 may include the gas nozzle 611*c* shown in FIG. 9. The gas nozzle 611*c* ejects the gas toward the joint Se1 between the ejection heads 23*a* and 23*b* located adjacent to each other in the width direction X. In the case where the joint Se1 has the shape of an upwardly recessed groove, the ink droplets dr may be accumulated in the joint Se1. Since the gas nozzle 611*c* ejects the gas to the joint Se1, it is possible to satisfactorily remove the ink droplets dr adhering to the joint Se1 (boundary portion).

Note that the gas nozzle 611*c* may eject the gas in the direction of extension of the joint Se1 (the direction of extension of the leg of either the ejection head 23*a* or 23*b*; a direction inclined to the −X direction toward the −Y side in the example shown in the drawing). The gas ejected in the direction of extension of the joint Se1 pushes out the ink droplets dr accumulated in the joint Se1 in the direction along the joint Se1. Accordingly, it is possible to satisfactorily remove the ink droplets dr accumulated in the joint Se1.

Figure 10:
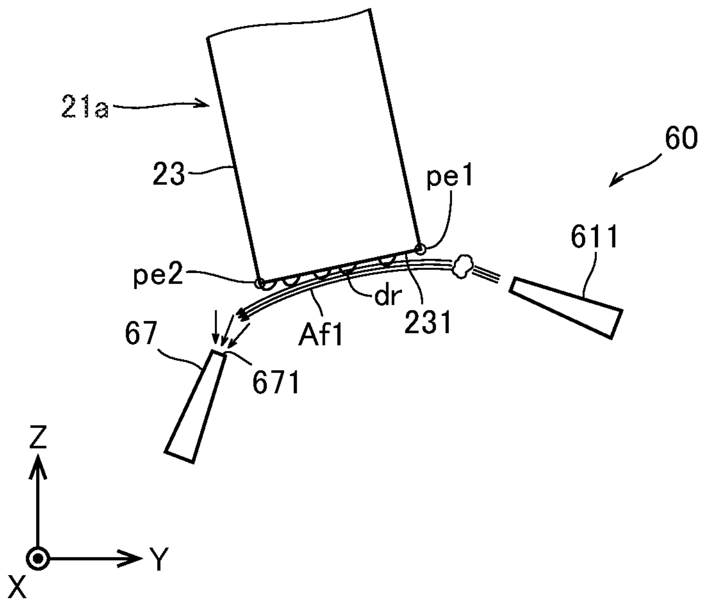
FIG. 10 is a diagram showing a gas nozzle according to the embodiment.

FIG. 10 is a side view of a suction part 67 according to the embodiment. As shown in FIG. 10, each cleaner 60 may include the suction part 67. The suction part 67 may include, for example, a pump or a fan and suck the gas ejected from the gas nozzles 611 of the gas ejector 61. The operation of the suction part 67 may be controlled by the controller 80. The suction part 67 has a suction port 671 for sucking the gas. The suction port 671 may be one opening that extends in the width direction X, or may be configured by a plurality of openings arranged in the width direction X. As shown in FIG. 10, the suction port 671 is located below the ejection surface 231. That is, the suction part 67 sucks the gas at a position below the ejection surface 231. The suction port 671 sucks the gas at a position away from the ejection surface 231 in the Y direction (the −Y direction in the example shown in the drawing). While the gas ejector 61 is ejecting the gas, the suction part 67 sucks the gas so as to guide the ink droplets dr departing from the ejection surface 231 toward the suction port 671. Accordingly, it is possible to prevent the release of the ink droplets dr.

Figure 11:
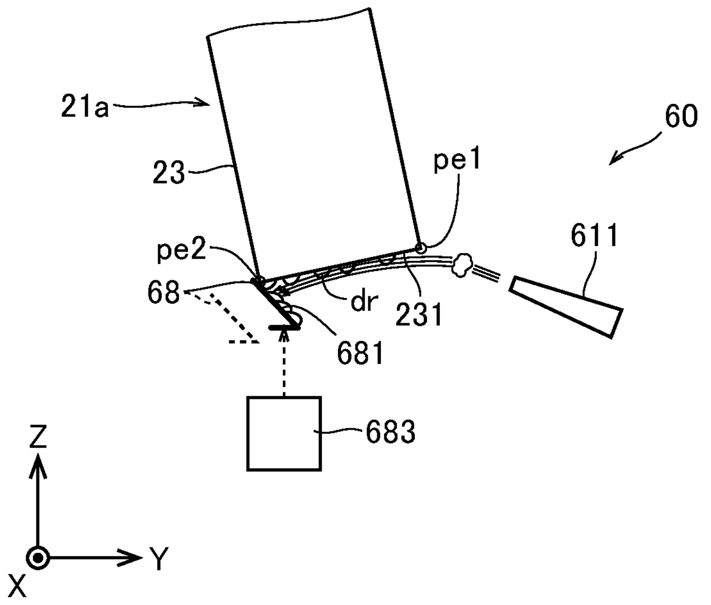
FIG. 11 is a side view showing a suction part according to the embodiment.

FIG. 11 is a side view of a guide member 68. As shown in FIG. 11, each cleaner 60 may include the guide member 68. The guide member 68 has a guide face 681 that is inclined relative to a horizontal plane and the ejection surface 231 of each ejection head 23. The guide face 681 is a flat surface extending in the width direction X. It is preferable that the length of the guide face 681 in the width direction X is greater than the length of each ejection head 23 in the width direction X. Alternatively, the length of the guide face 681 in the width direction X may be greater than the length of each head unit 21 in the width direction X.

Each cleaner 60 may include a guide face mover 683 shown in FIG. 11. The guide face mover 683 moves the guide member 68 between a close position at which the guide face 681 comes in contact with an ejection head 23 located at the cleaning position (in FIG. 11, the position indicated by the solid line) and a separated position at which the guide face 681 is located away from an ejection head 23, i.e., away from the close position (in FIG. 11, the position indicated by the broken line). The guide face mover 683 may include, for example, a ball screw, a rack and pinion, or a direct-acting mechanism such as a linear motor. The operations of the guide face mover 683 may be controlled by the controller 80.

As shown in FIG. 11, in the case of cleaning the ejection surface 231 of an ejection head 23, the guide face mover 683 moves the guide member 68 to the close position so as to bring the guide face 681 into contact with the other end pe2 of the ejection head 23. In this state, when the gas ejector 61 generates the airflow Af1, the ink droplets dr collected at the other end pe2 of the ejection head 23 are transferred to the guide face 681. Note that it is not an absolute necessity for the guide face 681 to come in contact with the other end pe2. For example, the guide face 681 may come into close proximity to the other end pe2. The ink droplets dr transferred from the ejection surface 231 to the guide face 681 drop along the guide face 681. The ink droplets dr dropping from the guide face 681 may be collected by, for example, the waste fluid tray 66 or any other means.

The presence of the guide member 68 with the guide face 681 facilitates the dropping of the ink droplets dr from the ejection surface 231 and thereby allows satisfactory removal of the ink droplets dr from the ejection surface 231.

Figure 12:
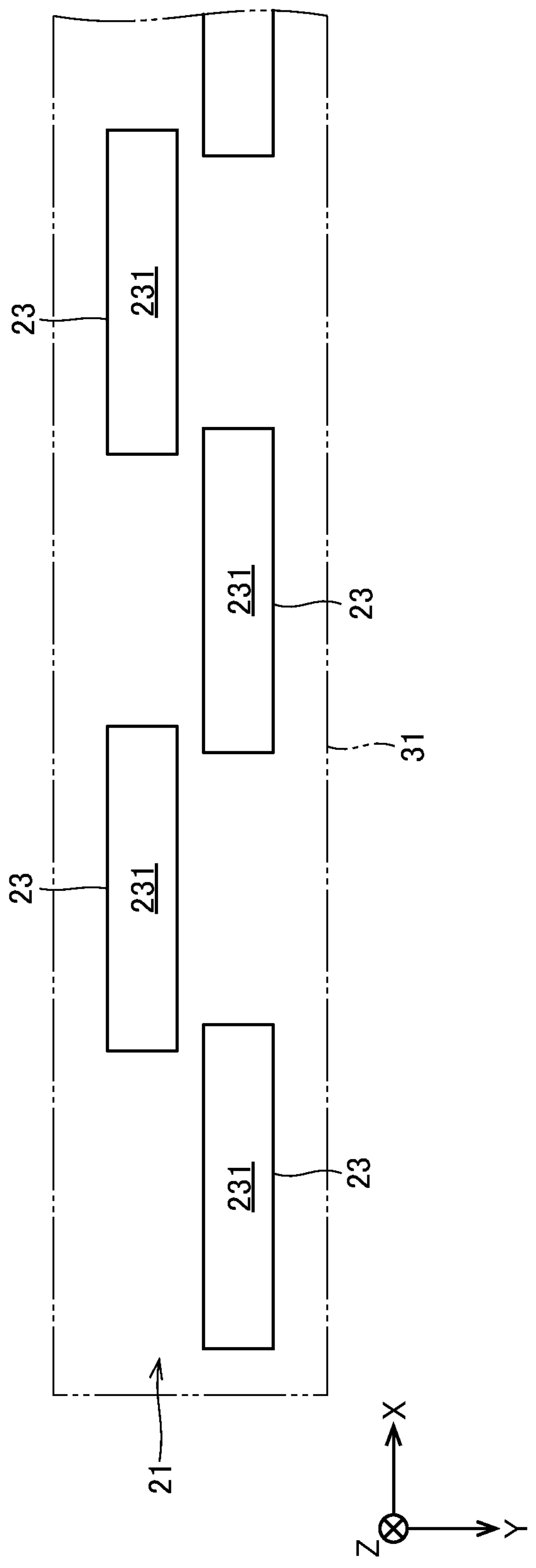
FIG. 12 is a bottom view showing one head unit according to a variation.

FIG. 12 is a diagram showing one head unit 21 according to a variation. As shown in FIG. 12, the head unit 21 includes a plurality of ejection heads 23 arranged in a staggered manner (in a zigzag) in the width direction X. That is, the ejection heads 23 are arranged in a plurality of rows (two rows in the example) in the Y direction and are arranged alternately on right and left in the width direction X. In this case, the mover 64 moves the gas ejector 61 to the position of each ejection head 23 arranged in a staggered manner. This allows individual cleaning of the ejection surface 231 of each ejection head 23.

While the invention has been shown and described in detail, the foregoing description is in all aspects illustrative and not restrictive. It is therefore understood that numerous modifications and variations can be devised without departing from the scope of the invention.

What is claimed is:

1. A printer for performing printing by ejecting ink droplets onto an upper surface of a long band-like base material, the printer comprising:
- a transporter that transports the base material in a first direction;
- at least one ejection head having an ejection surface in which a plurality of ink ejection outlets for ejecting ink are arranged in a second direction that intersects with the first direction; and
- a cleaner that cleans the ejection surface,
- wherein the cleaner includes:
  - a gas ejector that ejects gas to the ejection surface from a position away from the plurality of ink ejection outlets in the first direction,
- wherein the ejection surface is inclined vertically upward toward one side in the first direction, and
- wherein the gas ejector ejects the gas from one side in the first direction to the other side in the first direction.

2. The printer according to claim 1, wherein
- the gas ejector generates an airflow that goes at least from one end of the ejection surface to the other end thereof in the first direction.

3. The printer according to claim 1, wherein
- the gas ejector is capable of ejecting the gas to a region of the ejection surface that includes at least those of the plurality of ink ejection outlets from an ink ejection outlet located at one end in the second direction to an ink ejection outlet located at the other end in the second direction.

4. The printer according to claim 1, wherein
- the cleaner further includes:
- a temperature and humidity controller that adjusts temperature and humidity of the gas supplied from the gas ejector.

5. The printer according to claim 1, wherein
- the cleaner further includes:
- a suction part that sucks the gas ejected from the gas ejector.

6. The printer according to claim 5, wherein
- the cleaner further includes:
- a guide member that has a guide face inclined relative to the ejection surface and that moves ink applied to the other end of the ejection surface in the first direction, toward the guide face.

7. The printer according to claim 1, wherein
- the gas ejector is capable of ejecting the gas toward an inside of the ejection surface in the second direction from a position outwardly away from the ejection surface in the second direction.

8. The printer according to claim 1, wherein
- the gas ejector first starts to eject the gas from a first position and a second position away from the first position in the second direction and then starts to eject the gas from a third position located between the first position and the second position in the second direction.

9. The printer according to claim 1, wherein
- the at least one ejection head includes a plurality of ejection heads arranged in the second direction.

10. The printer according to claim 9, wherein
- the plurality of ejection heads include a first ejection head and a second ejection head located adjacent to the first ejection head in the second direction, and
- the gas ejector ejects the gas to a space between the first ejection head and the second ejection head.

11. The printer according to claim 9, wherein
- the cleaner further includes:
- a mover that moves the gas ejector in the second direction.

12. A printer for performing printing by ejecting ink droplets onto an upper surface of a long band-like base material, the printer comprising:
- a transporter that transports the base material in a first direction;
- at least one ejection head having an ejection surface in which a plurality of ink ejection outlets for ejecting ink are arranged in a second direction that intersects with the first direction; and
- a cleaner that cleans the ejection surface,
- wherein the cleaner includes:
  - a gas ejector that ejects gas to the ejection surface from a position away from the plurality of ink ejection outlets in the first direction, and
- wherein the gas ejector ejects the gas from a slit gas ejection outlet.

13. A printer for performing printing by ejecting ink droplets onto an upper surface of a long band-like base material, the printer comprising:
- a transporter that transports the base material in a first direction;
- at least one ejection head having an ejection surface in which a plurality of ink ejection outlets for ejecting ink are arranged in a second direction that intersects with the first direction; and
- a cleaner that cleans the ejection surface,
- wherein the cleaner includes:
  - a gas ejector that ejects gas to the ejection surface from a position away from the plurality of ink ejection outlets in the first direction, and wherein the gas ejector ejects the gas from a plurality of gas ejection outlets arranged in the second direction.

* * * * *